(12) United States Patent
LaVigne et al.

(10) Patent No.: US 8,340,091 B2
(45) Date of Patent: Dec. 25, 2012

(54) PACKET PROCESSING WITH ADJUSTED ACCESS CONTROL LIST

(75) Inventors: Bruce E. LaVigne, Roseville, CA (US); Alan R. Albrecht, Granite Bay, CA (US); Mauricio Sanchez, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 11/827,295

(22) Filed: Jul. 11, 2007

(65) Prior Publication Data
US 2009/0016336 A1    Jan. 15, 2009

(51) Int. Cl.
*H04L 12/28* (2006.01)

(52) U.S. Cl. .......... 370/389; 370/392; 370/401; 726/11; 726/12

(58) Field of Classification Search .................. 370/389, 370/395.59, 230.1; 713/153, 188
See application file for complete search history.

(56) References Cited

U.S. PATENT DOCUMENTS

| | | | |
|---|---|---|---|
| 6,763,018 B1 | 7/2004 | Puthiyandyil et al. | |
| 7,031,304 B1 * | 4/2006 | Arberg et al. | 370/360 |
| 7,096,498 B2 * | 8/2006 | Judge | 726/22 |
| 7,103,045 B2 | 9/2006 | Lavigne et al. | |
| 7,111,072 B1 | 9/2006 | Matthews et al. | |
| 7,159,242 B2 | 1/2007 | Genty et al. | |
| 7,167,922 B2 * | 1/2007 | Narayanan | 709/242 |
| 7,174,378 B2 * | 2/2007 | Yoon et al. | 709/225 |
| 7,185,365 B2 * | 2/2007 | Tang et al. | 726/13 |
| 7,215,637 B1 * | 5/2007 | Ferguson et al. | 370/230.1 |
| 7,447,901 B1 * | 11/2008 | Sullenberger et al. | 713/153 |
| 7,458,098 B2 * | 11/2008 | Judge et al. | 726/23 |
| 7,464,407 B2 * | 12/2008 | Nakae et al. | 726/22 |
| 7,486,674 B2 * | 2/2009 | Regan | 370/390 |
| 7,555,562 B2 * | 6/2009 | See et al. | 709/240 |
| 7,735,116 B1 * | 6/2010 | Gauvin | 726/2 |
| 7,793,138 B2 * | 9/2010 | Rastogi et al. | 714/4.1 |
| 2005/0102414 A1 * | 5/2005 | Hares et al. | 709/232 |
| 2005/0114522 A1 | 5/2005 | LaVigne et al. | |
| 2005/0220091 A1 | 10/2005 | LaVigne et al. | |
| 2005/0220092 A1 | 10/2005 | LaVigne et al. | |

* cited by examiner

*Primary Examiner* — Robert Wilson
*Assistant Examiner* — Brian O Connor

(57) ABSTRACT

Network devices and methods are provided for packet processing. One method includes using logic embedded in an application specific integrated circuit on a network device to dynamically adjust an access control list. According to the method, the access control list is adjusted in response to information received from a checking functionality related to packets received by the network device from a particular port. The method also includes handling packets later received from the particular port according to the adjusted access control list.

20 Claims, 5 Drawing Sheets

PACKET PROCESSING WITH ADJUSTED ACCESS CONTROL LIST

BACKGROUND

Computing networks can include multiple network devices such as routers, switches, hubs, servers, desktop PCs, laptops, workstations, and peripheral devices, e.g., printers, facsimile devices, and scanners, networked together across a local area network (LAN) and/or wide area network (WAN).

Networks can include a network appliance (NA), e.g., a checking functionality (CF) such as an intrusion prevention system (IPS) and/or intrusion detection system (IDS) that serves to detect unwanted intrusions/activities to the computer network. Unwanted network intrusions/activities may take the form of attacks through computer viruses and/or hackers, among others, trying to access the network. To this end, a CF can identify different types of suspicious network traffic and network device usage that can not be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others. An NA can also include other forms of diagnostic devices, accounting devices, counting devices, etc., operable on network packets of interest.

Network appliances are a class of products that provide network security services such as firewalling, intrusion detection, content filtering, spam filtering, and/or virtual private networks (VPNs). Network appliances arose and evolved independently of traditional high-speed network infrastructure devices such as routers, switches, bridges, etc. However, the underpinnings of modern network appliances are in fact a bridging or routing engine that in many instances replicates the functionality of the traditional high-speed network infrastructure device.

Network appliances, e.g., IPS/IDSs, counting/accounting, or diagnostic devices, may be slower than other network devices, such as switches and routers, and hence have slower throughput. Additionally, network appliances tend to replicate bridging and routing functions that have already been well-optimized and are significantly faster in network infrastructure devices, e.g., routers, switches, etc. For example, network devices have become more "intelligent" in their decision making capability at very fast speeds, e.g., 100+ Gbps. In contrast, network appliances can be several orders of magnitude slower in terms of throughput as compared to such modern high-speed network devices. Network appliances also tend to introduce latency issues when compared to network devices. Latency is a troublesome facet to introduce into a network because it negatively effects real time applications such as voice over IP (VoIP), e.g., latency can cause choppiness in conversations, etc., or storage area networks (SANs), e.g., latency can cause slow file operations.

Previous approaches use network appliances to examine each packet to determine what security-related action should be taken with respect to the packet. In some cases, the network appliance can signal the network device that a port should be disabled. However, if this port is shared among many users, or if a host is shared among many applications, disabling the port penalizes too many users.

DETAILED DESCRIPTION

Figure 1:
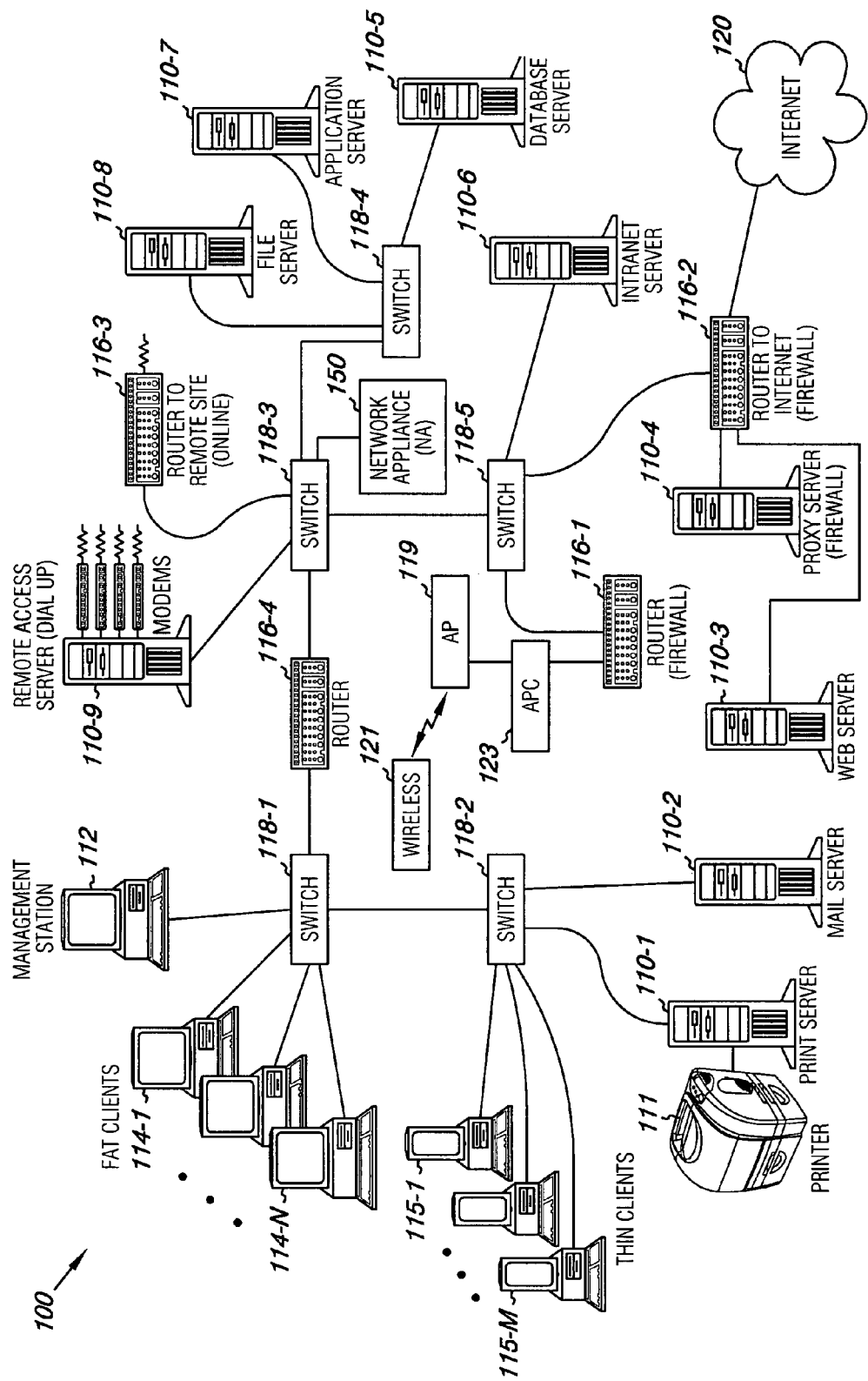
FIG. 1 is an example of a computing device network in which certain embodiments of the invention can be implemented.

Embodiments of the present invention may include network devices and methods for packet processing. One method includes using logic embedded in an application specific integrated circuit on a network device to dynamically adjust an access control list. According to the method, the access control list is adjusted in response to information received from a checking functionality related to packets received by the network device from a particular port. The method also includes handling packets later received from the particular port according to the adjusted access control list.

In some embodiments, the method includes adjusting the access control list (ACL) in relation to a new client sending packets through the particular port. Some embodiments also include adjusting the ACL in relation to a change in behavior of a client sending packets through the particular port. According to various embodiments, the ACL can be adjusted such that packets later received from the particular port are: dropped, sent to the checking functionality with an applied rate limit, forwarded on their original path with an applied rate limit, forwarded on their original path without an applied rate limit, and various combinations thereof. Embodiments described herein allow for the efficient collaboration of a checking functionality and a network device to improve the efficacy of the checking functionality by allowing it to operate on other traffic while the network device handles known bad traffic.

As used herein, "checking functionality" (CF) means an intrusion prevention system (IPS), an intrusion detection system (IDS), and can also include other forms of security devices, diagnostic devices, accounting devices, counting devices, etc., operable on network packets of interest, whether connected as a network appliance (e.g., 250-1 or 250-2 as described in connection with FIG. 2) or whether provided as logic integral to a particular network device (e.g., 241, 270, 260, or 265, as described in connection with FIG. 2).

A checking functionality can include a network appliance supplied by a third party vendor of network security devices or otherwise. As used herein, the term "network appliance" is used to mean an add-on device, e.g., "plug-in" or "application module" (as defined below), to a network as contrasted with a "network device", e.g., router, switch, and/or hub, etc., which are sometimes considered more as "backbone" component devices to a network. The operations of such devices will be recognized and understood by one of ordinary skill in the art. A checking functionality can be provided in the form of software, application modules, application specific integrated circuit (ASIC) logic, and/or executable instructions operable on the systems and devices shown herein or otherwise.

"Software", e.g., computer executable instructions as used herein, includes a series of executable instructions that can be stored in memory and executed by the hardware logic of a processor (e.g., transistor gates) to perform a particular task.

Memory, as the reader will appreciate, can include random access memory (RAM), read only memory (ROM), non-volatile memory (such as Flash memory), etc.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

In some embodiments, logic in the form of hardware, e.g. application specific integrated circuits (ASICs) on a network chip on a network device, receives a network packet. The logic processes network packets on ingress to a network chip, e.g., using an ASIC for processing well-known packet header information, such as layer 2 to layer 4, associated with the network packets. The logic is further operable to establish a bidirectional communication path between the network chip and a checking functionality (CF) as is described in more detail in copending, commonly assigned U.S. patent application Ser. No. 11/809512, entitled "Packet Processing", by the same inventors, filed Jun. 1, 2007, which is incorporated in full herein.

FIG. 1 illustrates an embodiment of a computing device network 100 in which some embodiments of the invention can be implemented. As shown in FIG. 1, a number devices can be networked together in a LAN, WAN and/or metropolitan area network (MAN) via routers, hubs, switches and the like. As used herein a "network device" means a switch, router, hub, bridge, etc., e.g., a device which may have network chips having hardware logic, e.g., in the form of application specific integrated circuits (ASICs), and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

As used herein, a "network" can provide a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9. The examples described here do not provide an exhaustive list of servers that may be used in a network.

The network embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks, such as the Internet 120, using routers, 116-1, 116-2, 116-3, and 1164, and hubs and/or switches 118-1, 118-2, 118-3, 118-4, and 118-5. As noted above, such network devices can include network chips having hardware logic, e.g., in the form of application specific integrated circuits (ASICs), associated with the number of network ports. The term "network" as used herein is not limited to the number, type, and/or quantity of network devices illustrated in FIG. 1.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

Program instructions, as described in more detail here, can reside on some network devices. For example, program instructions in the form of firmware and/or application modules can be resident on the network 100 in the memory of a network management station 112 and/or one or more routers, 116-1, 116-2, 116-3, 116-4, hubs, and/or switches 118-1, 118-2, 118-3, 118-4, 118-5, etc., and can be executable by the logic (e.g., hardware in the form of transistor gates) thereon.

As one of ordinary skill in the art will appreciate, each network device in the network 100 can be physically associated with a port of a switch to which it is connected. Information in the form of network packets, e.g., data packets, can be passed through the network 100. Users, e.g., clients, physically connect to the network through ports or APCs 123 on the network 100. Data frames, or packets, can be transferred between network devices by means of a network device's, e.g., switch's, logic link control (LLC)/media access control (MAC) circuitry, as associated with ports on a network device. A network switch forwards network packets received from a transmitting network device to a destination network device based on the header information in received network packets. A network device can also forward packets from a given network to other networks through ports on one or more other network devices. As the reader will appreciate, an Ethernet network is described herein. However, embodiments are not limited to use in an Ethernet network, and may be equally well suited to other network types, e.g., asynchronous transfer mode (ATM) networks, etc.

According to embodiments described herein, a checking functionality, e.g., a network appliance intrusion system (IS) which serves to detect and/or evaluate suspicious activity, can be located in a "centralized" location in network 100. As used herein, the term "centralized" means a particular location in the network 100 accessible from a number of network devices, e.g., 118-1, . . . , 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge network devices" and other network devices, e.g., switches 118-3 and router 116-4, may be referred to topographically as "central network devices". As used herein, "edge network devices" topographically means network devices, e.g., 118-1, having ports connected directly to network clients, 115 and 114-1, . . . 114-N on the "edge" of a network. The network clients can include servers, "fat" and "thin" clients, including mobile network clients connected through an APC, etc., as discussed above. As used herein, "central network devices" topographically means network devices, e.g., 118-3, which are connected to other network devices, 118-2, but which are not necessarily connected directly to network clients such as 115 and 114-1, . . . 114-N, etc.

However, the term "central" in central network devices is not to be confused with the use of the term "centralized". In some embodiments, a "centralized" CF, as defined above, may be integral to or associated with an edge network device. That is, the topographical location in a given network of the CF can be in association with switch 118-1, connected to "fat" and "thin" clients, 114-1, . . . , 114-N, and 115-1, . . . , 115-M, in FIG. 1, or equally in association with switch 118-3, or switch 118-5, etc. Embodiments are not limited to the examples described herein. As one of ordinary skill in the art will appreciate, the intent is to place an CF in a topographical location in network 100 which has a sufficiently high bandwidth associated therewith relative to the bandwidth of other devices attached to the network 100 to perform a sufficient throughput associated with a particular CF. As the reader will appreciate, certain so termed "edge network devices", e.g., switch 118-1, may in fact have a large network packet traffic bandwidth capability relative to other network devices, e.g., 118-3, 118-4, etc., in the network 100 so as to be worthwhile candidates for associating a CF therewith. Embodiments are not limited to the examples given in connection with FIG. 1.

In the example network implementation of FIG. 1, a network appliance 150 is shown in association with switch 118-3. The network appliance 150 serves as a checking functionality. As the reader will appreciate, a network appliance 150 can include processor and memory resources capable of storing and executing instructions to perform a particular role or function. A network appliance can also include one or more network chips (e.g., ASICs) having logic and a number of ports.

In certain embodiments, the checking functionality performed by the network appliance 150 can perform the role of an intrusion prevention system (IPS), as may be supplied by a third party vendor of network security devices. In certain embodiments, the checking functionality performed by the network appliance 150 can perform the role of an intrusion detection system (IDS), or another diagnostic device, accounting device, counting device, etc., as may be supplied by a third party vendor. Embodiments are not limited to the examples given here. The various configurations and operations of such different checking functionalities are known and understood by one of ordinary skill in the art.

Figure 2:
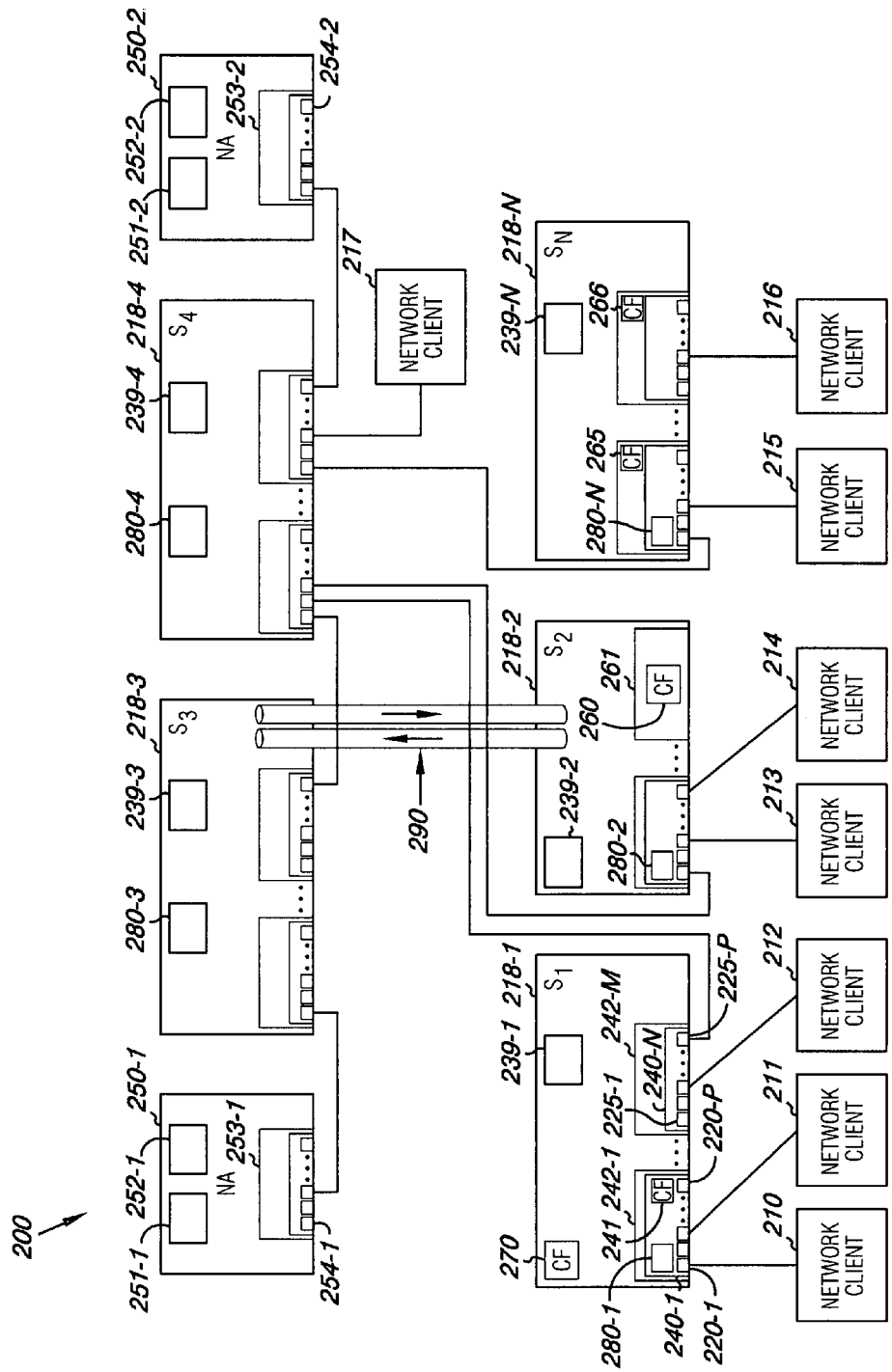
FIG. 2 illustrates a portion of a network, such as shown in FIG. 1, which includes network devices in which certain embodiments of the present invention can be implemented.

FIG. 2 illustrates a portion 200 of a network, e.g., network 100 shown in FIG. 1, including embodiments of network devices, 218-1, 218-2, . . . 218-N, suited to implement embodiments of the present invention. By way of illustration and not by way of limitation, some of the network devices are "edge network devices", e.g., 218-1, having ports connected directly to network clients, 210, 211, 212, 213, 214, 215, 216, 217. The network clients can include "fat" and "thin" clients, including mobile network clients connected through an APC 123, etc., as discussed above in connection with FIG. 1. Additionally, by way of illustration and not by way of limitation, some of the network devices are "central network devices", e.g., 218-3 which are connected to other network devices, e.g., 218-4, but which are not connected directly to network clients, 210, . . . , 217, mobile devices, etc.

As described in connection with FIG. 1, the network devices, 218-1, 218-2, . . . 218-N, of FIG. 2 can include switches, routers, hubs, etc. (shown as switches in FIG. 2). The network devices, 218-1, 218-2, . . . 218-N, can include a number of printed circuit boards, or "blades", 242-1, . . . , 242-M, which can include a number of network chips, e.g., 240-1, . . . , 240-N, including logic circuitry (hardware). Each network chip, 240-1, . . . , 240-N, can include a number of network ports, 220-1, . . . , 220-P; 225-1, . . . ,225-P, to send and receive data packets (network traffic) throughout the network 200. The logic circuitry of the number of network chips, e.g., 240-1, . . . , 240-N, can be in the form of an application specific integrated circuit (ASIC) and include logic to serve as a media access controller (MAC).

As shown in FIG. 2, the number of ports 220-1, 220-2, . . . , 220-P can be included on a network chip 240-1,. . . , 240-N and have access to logic circuitry associated with any of the network chips 240-1, . . . , 240-N through a crossbar, crosslink, and/or switching fabric 239-1, 239-2, 239-3, 239-4, 239-N as the same will be understood by one of ordinary skill in the art. As used herein, the designators "M", "N", and "P" are used to illustrate that networks can have a number of network devices, that a given network device may have a number of blades, and that the network devices may support or contain a different number of ports. Embodiments are not limited to the example shown in FIG. 2.

As shown in the embodiment of FIG. 2, network appliances 250-1 and 250-2 can be connected to a network device in a centralized location. The centralized location may be connected to a central network device, e.g., 218-3 (network device not connected directly to network clients), or may be connected to an edge network device, e.g. 218-4 (network device connected directly to network clients). As shown in FIG. 2, a given network appliance can include processor 251-1, 251-2, and memory 252-1, 252-2 resources capable of storing and executing instructions to perform a particular role or function. The network appliance can also include one or more chips (ASICs), e.g., 253-1, 253-2, having logic and a number of ports 254-1, 254-2, as the same have been described above.

The network appliances 250-1 and 250-2 can serve as checking functionalities. As also shown in the embodiment of FIG. 2, in some embodiments, a checking functionality (CF) may be embedded, either within a network device's ASIC (e.g., 241), or on the port blades (265, 266), or within the network device itself, either as a service or security plug-in blade (e.g., CF 260 on plug-in blade 261), or built in to the network device (e.g., 270). Embodiments of the invention are not limited to the actual location of the checking functionality with the network 200.

Although the illustration of FIG. 2 appears to illustrate one network chip, e.g., 240-1, per blade, e.g., 242-1, and two blades per network device, one of ordinary skill in the art will appreciate that a given network device 218-1 can include a number of blades, each having a number of network chips, and each chip having a number of network ports.

As described in connection with FIG. 1, the CF can be an intrusion detections system (IDS), or another diagnostic device, accounting device, counting device, etc., as may be supplied by a third party vendor of network checking devices. Embodiments are not limited to the examples given here.

In the embodiment of FIG. 2, a network packet, e.g., data packet, is received by a port, e.g., 220-1, on a network device, e.g., switch 218-1, from a network client, e.g., 210. As described in more detail next in connection with FIG. 3, the network device, e.g., switch 218-1, is configured to handle packets received from a port, e.g., 220-1, according to an access control list (ACL), e.g., 280-1, 280-2, 280-3, 280-4, . . . ,280-N. The network device, e.g., switch 218-1, is able to use logic associated with an ASIC of a network chip 240-1, to dynamically adjust an ACL, e.g., 280-1, in response to information received from a checking functionality, e.g., CF 241, related to packets previously sent from the network device, e.g., switch 218-1, to the CF, e.g., 241.

Figure 3:
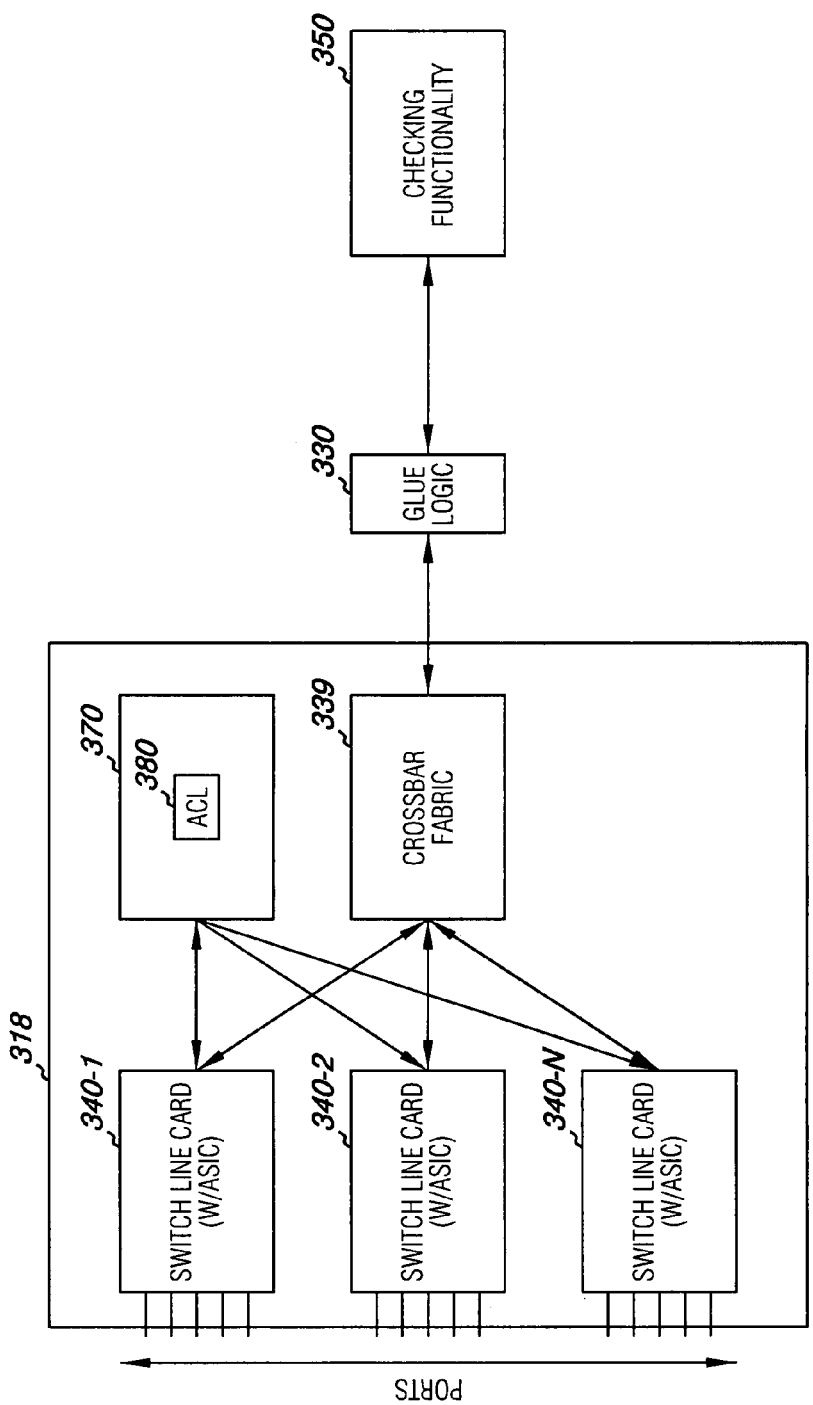
FIG. 3 illustrates one embodiment dynamically adjusting an access control list in response to information received from a checking functionality.

FIG. 3 illustrates one embodiment dynamically adjusting an access control list (ACL) 380 in response to information received from a checking functionality 350. As shown in FIG. 3, the switch 318 includes a number of network chips 340-1, 340-2, . . . , 340-N (e.g., switch line cards with ASICs) which include ports to receive network packet traffic. Although only one ACL 380 is shown in the ACL block 370 of FIG. 3, one of ordinary skill in the art will appreciate that each line card or ASIC, 340-1, 340-2, . . . , 340-N, will have an associated ACL 380 with a number of lines. The switch also includes crossbar switching fabric 339 as the same has been noted in FIG. 2 to apply packet forwarding logic. As shown in FIG. 3, other glue logic 330, as the same will be appreciated by one of ordinary skill in the art, can connect packets with a checking functionality (CF) 350. For reasons described in the background, the switch 318 is referred to herein as a fast processing logic plane due to the speed with which the ASIC hardware can process packet traffic. In contrast, the checking functionality 350 with its higher order packet analysis functionality, e.g., pattern matching capabilities, is referred to herein as a slow processing logic plane compared to the ASIC datapath.

As shown in the example embodiment of FIG. 3, a network chip, e.g., 340-1, of network device 318 can receive packets via a particular port. Packets can be forwarded, by logic on the ASIC on a network chip, e.g., 340-1, to a checking functionality 350. The checking functionality 350 can operate to return information related to the packets to the ASIC on the network chip 340-1 of network device 318. Logic on the ASIC can dynamically adjust an ACL 380 in response to the information received from CF 350.

In the example embodiment of FIG. 3, the ACL 380 can be adjusted, e.g., encoded, to store a set of rules for traffic (packets) transmitted through each port. As the reader will appreciate, the rules stored in ACL 380 can be used by logic in the ASIC on network chips, e.g., chip 340-1, to control inbound and outbound traffic on each port. The ACL 380 can be adjusted in relation to a new client sending packets through a particular port. Similarly, the ACL 380 can be adjusted in relation to a change in behavior of a client sending packets through a particular port. Although the ACL block 380 is depicted as common to all line cards, 340-1, 340-2, . . . , 340-N, one with ordinary skill in the art will appreciate that this block may be embodied within or attached to each line card or ASIC, 340-1, 340-2, . . . , 340-N, for performance reasons.

In the packet processing example embodiment illustrated in FIG. 3, logic on a network chip, e.g., chip 340-1, can adjust and apply ACL 380 rules such that packets later received from a particular port are: dropped, sent to the CF 350 with an applied rate limit, forwarded on their original path with an applied rate limit, forwarded on their original path without an applied rate limit, and various combinations thereof. As the reader will appreciate, a rate limit can include applying a restriction to limit the number of packets sent in a given amount of time such that packets in excess of the limit are dropped. As the reader will also appreciate, a packet's original path includes the original media access controller (MAC) or internet protocol (IP) address to which the packet was originally addressed.

Figure 4:
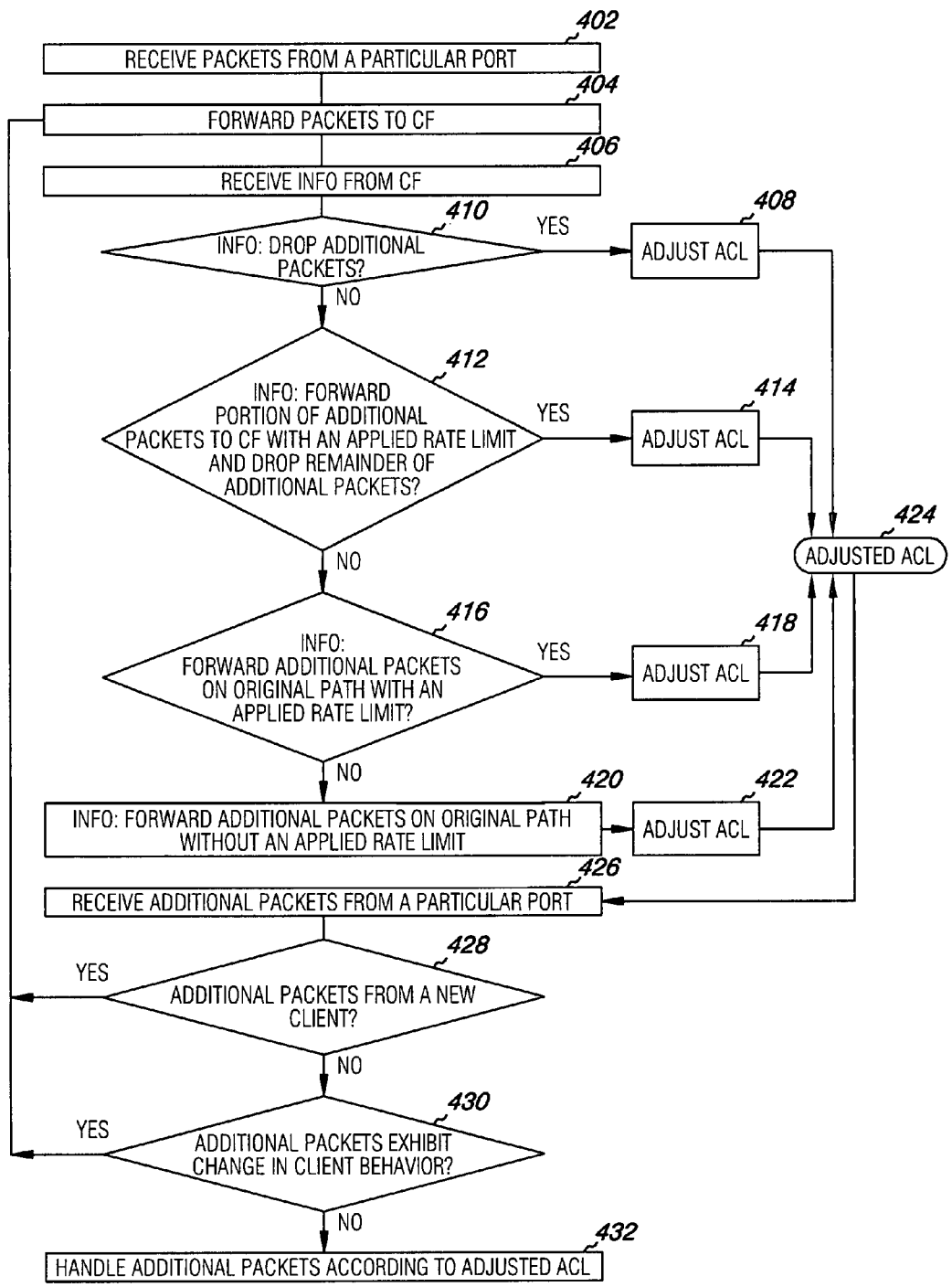
FIG. 4 provides a flow chart illustrating one method for packet processing.

FIG. 4 provides a flow chart illustrating one method for packet processing. As shown in the example embodiment of FIG. 4, packets can be received from a particular port at 402. The port can be on a network chip, e.g., chip 340-1 in FIG. 3, on a network device, e.g., 318 in FIG. 3. Logic on an application specific integrated circuit (ASIC) of a network chip can operate to forward the packets to a checking functionality (CF) at 404.

After processing the packets, the CF, e.g., 350 in FIG. 3, can return information to the network device, pertaining to the processed packets. The network device can receive the information at 406. The information received by the network device can contain rules to be encoded in an adjusted access control list (ACL), e.g., 380 in FIG. 3. Logic on an ASIC on a network chip in the network device can adjust the ACL in response to the information received from the CF.

If the information 410 indicates that the ACL should be adjusted to drop additional packets received from a particular port, then logic can adjust the ACL accordingly at 408. If the information 412 indicates that a portion of additional packets received from a particular port should be forwarded to the CF with an applied rate limit and the remainder of the packets should be dropped, logic can adjust the ACL accordingly at 414. If the information 416 indicates that additional packets received from the particular port should be forwarded on the original path of the packets with an applied rate limit, logic can adjust the ACL accordingly at 418. If the information 420 indicates that additional packets received from a particular port should be forwarded on the original path of the packets without an applied rate limit, logic can adjust the ACL accordingly at 422. The examples given here are illustrative and do not limit the range of adjustments that could be made to an ACL in response to information received from a CF related to packets processed by the CF. The adjusted ACL, as encoded with the appropriate adjustments is represented by block 424.

The network device can receive additional packets from the particular port at 426. At 428, if the additional packets are from a new client, they can be sent to the CF for processing at 404. If the additional packets are not from a new client, a determination can be made as to whether the additional packets exhibit a change in client behavior at 430. If the additional packets indicate a change in client behavior, they can be sent to the CF for processing at 404. If the additional packets do not indicate a change in client behavior, at 432, the network device can handle the packets according to the adjusted ACL 424.

In some embodiments the logic will tunnel encapsulate selected "mirror-stolen" data packets and can forward those packets to the network appliance 250-1 through a secure tunnel, e.g., 290 in FIG. 2. As used herein the term "mirror-stealing" means the packet is denied access to requested ports and a copy of the packet is forwarded to the CF. One example of the manner in which a "mirror-stolen" packet can be forwarded to a network appliance is provided in a co-pending, commonly assigned U.S. patent application Ser. No. 11/712,706, entitled, "Packet Tunneling", by inventors Bruce LaVigne, et. al., filed Mar. 1, 2007, which is incorporated in full herein. The same is not described more fully herein so as not to obscure embodiments of the present invention.

In some embodiments, the CF may chose to drop a suspicious packet received from the mirror-stealing operation. However, if a packet passes the checking functionality applied by the network appliance, e.g., is "cleared," the logic of a network device associated with the network appliance will securely tunnel encapsulate the packet and can forward the packet to the originating switch, e.g., switch 218-1. One example of the manner in which the logic of the network device associated with the appliance can securely tunnel encapsulate the packet and forward the packet to the originating switch is provided in a co-pending, commonly assigned U.S. patent application Ser. No. 11/788,179, entitled "Marked Packet Forwarding", by inventors Mark Gooch, et. al., filed Apr. 19, 2007, which is incorporated in full herein. The same is not described more fully herein so as not to obscure embodiments of the present invention.

Upon arrival at the originating switch, this switch may allow the packet to be forwarded based upon application of regular forwarding logic. One example of the manner in which an originating switch, e.g., 218-1, may forward a returned "mirror-stolen" packet is provided in a co-pending, commonly assigned U.S. patent application Ser. No. 11/784,664, entitled, "Locating Original Port Information", by inventors Bruce LaVigne, et. al., filed Apr. 9, 2007, which is incorporated in full herein. The same is not described more fully herein so as not to obscure embodiments of the present invention.

According to various embodiments, the instructions communicated back to the network device, e.g., switch 318 in FIG. 3, can include an instruction to allow network packets to be forwarded using regular forwarding logic, an instruction to deny network packets based on the evaluation, an instruction to rate limit packets based on the evaluation, etc. An example of rate limiting packets in association with an evaluation of particular packet behavior is provided in copending, commonly assigned U.S. patent application Ser. No. 11/710,804, entitled "Network Traffic Monitoring", by Shaun Wackerly, filed on Feb. 26, 2007, the same of which is incorporated herein by reference. As the reader will appreciate, computer executable instructions stored on memory and executable by a processor on a switch, e.g., 318, can execute to implement any number of variations on the above describe actions.

According to certain embodiments, providing the bidirectional communication between the network device and the CF includes communicating information related to forwarded packets back to the network device. Logic on the network device can then proceed to enforce traffic flow decisions, e.g., ACL rules, on packets based on the information communicated from the CF.

Figure 5:
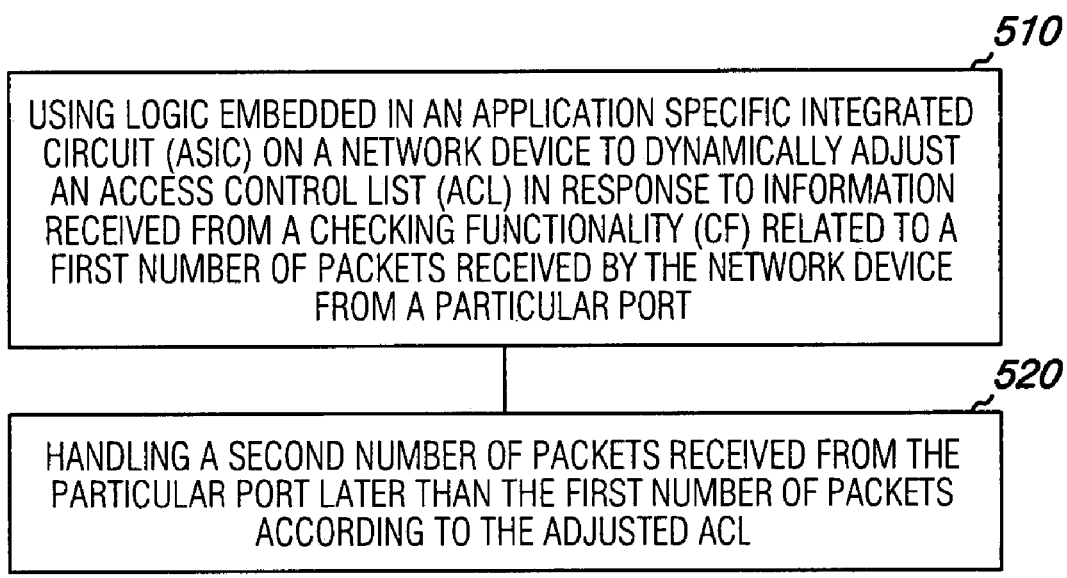
FIG. 5 provides a flow chart illustrating one method for packet processing.

FIG. 5 provides a flow chart illustrating one method for packet processing. As shown in the embodiment of FIG. 5 at block 510, the method includes using logic embedded in an application specific integrated circuit (ASIC) on a network device to dynamically adjust an access control list (ACL) in response to information received from a checking functionality (CF) related to a first number of packets received by the network device from a particular port. At block 520, the method includes handling a second number of packets received from the particular port later than the first number of packets according to the adjusted ACL. Embodiments are not limited to the example given herein.

It is to be understood that the above description has been made in an illustrative fashion, and not a restrictive one. Although particular embodiments have been illustrated and described herein, those of ordinary skill in the art will appreciate that other component arrangements and device logic can be substituted for the particular embodiments shown. This claims are intended to cover such adaptations or variations of some embodiments of the disclosure, except to the extent limited by the prior art.

In the foregoing Detailed Description, some features are grouped together in a single embodiment for the purpose of streamlining the disclosure. This method of description is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A method for packet processing, the method comprising:
using logic embedded in an application specific integrated circuit (ASIC) on a network device to:
forward a first number of packets received by the network device from a first client via a particular port to a location different than a destination address of the first number of packets;
receive information from the location including rules to encode in an access control list (ACL) to adjust the ACL;
encode the rules in the ACL;
handle a second number of packets received from the particular port later than the first number of packets differently than the first number of packets according to the rules encoded in the ACL in response to the second number of packets being from the first client and in response to the second number of packets not indicating a change in behavior of the first client; and
forward the second number of packets to the location in response to the second number of packets being from a second client or in response to the second number of packets indicating a change in behavior of the first client.

2. The method of claim 1, wherein the method includes adjusting the ACL in relation to a new client sending packets through the particular port.

3. The method of claim 1, wherein the method includes adjusting the ACL in relation to a change in behavior of a client sending packets through the particular port.

4. The method of claim 1, wherein the method includes adjusting the ACL such that the second number of packets are dropped.

5. The method of claim 1, wherein the method includes adjusting the ACL such that a portion of the second number of packets are sent to the location with an applied rate limit.

6. The method of claim 5, wherein the method includes adjusting the ACL such that a remainder of the second number of packets are dropped, wherein the second number of packets is equal to the portion of the second number of packets plus the remainder of the second number of packets.

7. The method of claim 1, wherein the method includes adjusting the ACL such that the second number of packets are forwarded on their original path with an applied rate limit.

8. The method of claim 1, wherein the method includes adjusting the ACL such that the second number of packets are forwarded on their original path without an applied rate limit.

9. A network system, comprising:
a checking functionality (CF) device associated with at least one network device, wherein the CF device is configured to send information related to a traffic flow to at least one of a number of network devices; and the number of network devices having logic embedded in an application specific integrated circuit (ASIC) and a number of network ports for the number of network devices for receiving and transmitting packets therefrom;

wherein logic of at least one of the number of network devices is configured to:

forward at least a first portion of the traffic flow received by the network device from a first client via a particular port to the CF device where the CF device is located in a location different than a destination address of the traffic flow;

receive information from the CF device including rules to encode in an access control list (ACL) to adjust the ACL;

encode the rules in the ACL;

process a second portion of the traffic flow, received later than the first portion, according to the adjusted ACL in response to the second portion being from the first client and in response to the second portion not indicating a change in behavior of the first client; and forward the second portion of the traffic flow to the CF device in response to the second portion being from a second client or in response to the second portion indicating a change in behavior of the first client.

10. The network system of claim 9, wherein logic can process the second portion of the traffic flow according to the adjusted ACL such that packets associated with the traffic flow are dropped.

11. The network system of claim 9, wherein logic can process the second portion of the traffic flow according to the adjusted ACL such that a particular portion of packets associated with the second portion of the traffic flow are sent to the CF device at an applied rate limit.

12. The network system of claim 11, wherein logic can process the second portion of the traffic flow according to the adjusted ACL such that a remainder of packets associated with the second portion of the traffic flow are dropped, wherein the remainder of packets is equal to all packets not included in the particular portion of packets sent to the CF device.

13. The network system of claim 9, wherein logic can process the second portion of the traffic flow according to the adjusted ACL such that packets associated with the second portion of the traffic flow are forwarded on their original path at an applied rate limit.

14. The network system of claim 9, wherein logic can process the second portion of the traffic flow according to the adjusted ACL such that packets associated with the second portion of the traffic flow are forwarded on their original path without an applied rate limit.

15. The network system of claim 9, wherein logic can adjust the ACL in response to a new client sending packets through the traffic flow.

16. The network system of claim 9, wherein logic can adjust the ACL in response to a change in behavior of a client sending packets through the traffic flow.

17. A method for packet processing, the method comprising:

forwarding a number of packets received from a first client via a particular port on a network device to a checking functionality (CF) device where the CF device is located in a location different than a destination address of the first number of packets;

receiving a rule set from the CF device for the particular port in response to the forwarded number of packets as an input to logic of a network chip for the network device, the network device having a number of network ports for receiving and transmitting packets therefrom;

encoding the rule set in an access control list (ACL);

using logic of the network chip to apply the rule set to process a second number of packets received via the particular port later than the first number of packets in response to the second number of packets being from the first client and in response to the second number of packets not indicating a change in behavior of the first client; and using logic of the network chip to forward the second number of packets to the CF in response to the second number of packets being from a second client or in response to the second number of packets indicating a change in behavior of the first client.

18. The method of claim 17, wherein the method includes using logic of the network chip to apply the rule set to process the second number of packets by a process selected from the group including:

dropping the packets;

tunneling the packets to the CF device at an applied rate limit;

forwarding the packets to their original destination at an applied rate limit; and forwarding the packets to their original destination without an applied rate limit.

19. The method of claim 17, wherein the method includes adjusting the rule set in response to a new client sending packets through the particular port.

20. The method of claim 17, wherein the method includes adjusting the rule set in response to a change in behavior of a client sending packets through the particular port.

* * * * *